United States Patent
Colby et al.

(10) Patent No.: US 10,377,102 B2
(45) Date of Patent: Aug. 13, 2019

(54) REMOVABLE CONNECTOR FOR PRE-CURED TREAD AND METHODS FOR FORMING A RETREADED TIRE

(71) Applicants: E. Bruce Colby, Greenville, SC (US); Metodi L. Ikonomov, Clermont-Ferrand (FR); Cesar E. Zarak, Simpsonville, SC (US); Michael Widmyer, Duncan, SC (US); Dimitri G. Tsihlas, Greer, SC (US)

(72) Inventors: E. Bruce Colby, Greenville, SC (US); Metodi L. Ikonomov, Clermont-Ferrand (FR); Cesar E. Zarak, Simpsonville, SC (US); Michael Widmyer, Duncan, SC (US); Dimitri G. Tsihlas, Greer, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 695 days.

(21) Appl. No.: 14/915,043

(22) PCT Filed: Aug. 30, 2013

(86) PCT No.: PCT/US2013/057730
§ 371 (c)(1),
(2) Date: Feb. 26, 2016

(87) PCT Pub. No.: WO2015/030826
PCT Pub. Date: Mar. 5, 2015

(65) Prior Publication Data
US 2016/0207268 A1    Jul. 21, 2016

(51) Int. Cl.
*B29D 30/56* (2006.01)
*B29D 30/54* (2006.01)

(52) U.S. Cl.
CPC ........... *B29D 30/542* (2013.01); *B29D 30/56* (2013.01); *B29D 2030/541* (2013.01); *B29D 2030/544* (2013.01)

(58) Field of Classification Search
CPC .................. B29D 30/56; B29D 30/542; B29D 2030/541; B29D 2030/544
See application file for complete search history.

(56) References Cited

U.S. PATENT DOCUMENTS 6,408,910 B1   6/2002  Lagnier et al.
8,267,134 B2   9/2012  Mayni et al.
(Continued)

FOREIGN PATENT DOCUMENTS

EP       858875 A1 *   8/1998
JP    2010-173614 A *   8/2010
(Continued)

OTHER PUBLICATIONS

Machine translation for Japan 2010-173614 (Year: 2018).*
(Continued)

*Primary Examiner* — Steven D Maki
(74) *Attorney, Agent, or Firm* — Hahn Loeser & Parks LLP

(57) ABSTRACT

The invention includes methods of forming a retreaded tire, and treads there for. Particular embodiments of such methods provide a tire carcass configured to receive the tire tread along an annular tread-receiving area and a pre-cured tire tread including a tread body and a detachable connector. The connector is arranged within a thickness of the tread between a top void portion and a bottom void portion and extending across a width of the top void portion and of the bottom void portion. The detachable connector is configured to separate from the tread upon application of a separation force. Further steps include assembling a retreaded tire by arranging the tire tread atop a bonding layer arranged between the tire tread and the tire carcass, bonding the tire (Continued)

tread to the tire carcass, and removing the detachable connector from the top void portion after the step of bonding.

20 Claims, 6 Drawing Sheets

(56) References Cited

U.S. PATENT DOCUMENTS

| | | |
|---|---|---|
| 8,357,254 B2 | 1/2013 | Cerny |
| 2011/0214789 A1 | 9/2011 | Cress et al. |
| 2012/0097300 A1* | 4/2012 | Colby .................... B29D 30/56 152/154.2 |
| 2012/0103485 A1* | 5/2012 | Colby .................... B29D 30/56 152/154.2 |
| 2012/0186725 A1 | 7/2012 | Majumdar et al. |
| 2012/0186727 A1 | 7/2012 | Inukai et al. |

FOREIGN PATENT DOCUMENTS

| | | |
|---|---|---|
| WO | 2013002797 A1 | 1/2013 |
| WO | WO-2013/048480 A1 * | 4/2013 |
| WO | WO-2013/095406 A1 * | 7/2013 |
| WO | 2013115810 A1 | 8/2013 |

OTHER PUBLICATIONS

Machine transaltion for Europe 858875 (Year: 2018).*
PCT/US2013/057730 International Search Report and Written Opinion dated Jan. 22, 2014, 11 pages.

* cited by examiner

REMOVABLE CONNECTOR FOR PRE-CURED TREAD AND METHODS FOR FORMING A RETREADED TIRE

This application is a National Stage application of International Application No. PCT/US2013/057730, filed Aug. 30, 2013.

BACKGROUND OF THE INVENTION

Field of the Invention

This invention relates generally to retreaded tires and methods for forming the same, and more particularly, to retreaded tire treads having one or more connectors arranged within a void extending into the tread thickness.

Description of the Related Art

A retreaded tire consists of attaching a new tread to a pre-existing tire carcass. The tire carcass is prepared to receive the new tread by removing the prior tread, such as through a buffing or abrading operation. The new tread is then applied to the tire carcass and cured to secure the new tread to the carcass.

Methods of curing retreaded tires include placing an assembled retreaded tire at least partially within a flexible curing membrane to create a sealed fluid chamber between the curing membrane and the tire. The combination of a retreaded tire with an installed curing membrane is referred to herein as a tire-membrane assembly.

In the prior art, conventional pre-cured treads include an undertread portion, which is arranged below any void extending into the tread from a top side of the tread, which provides a closed-bottom void. The thickness of tread arranged below the void is referred to as the undertread, which is generally not encouraged to be exposed during the life of the tire. Therefore, the undertread adds to the total tread weight, but is not utilized as part of the skid or operating depth of the tread.

While the undertread generally remains unused during the life of a retread, in conventional retreading operations, the undertread is useful for connecting portions of a tread arranged on opposing sides of a void for improved handling of the tread during retreading operations. Also, when the undertread is not present in the pre-cured tread, the appearance of the void bottom may not be satisfactory since it is not molded. As a result, the bonding layer exposed at the bottom of the void may appear rough and may flow into the void. Still further, without the undertread, the portions of the tread arranged on opposing sides of the void can move towards each other and ultimately compress together when in the flexible curing membrane during the curing process. Therefore, there is a need to both remove the undertread to reduce the provision of tread material unusable during the life of a tread and yet provide a means for maintaining the spacing of the tread portions arranged on opposing sides of a void that also provides an aesthetically pleasing void bottom.

SUMMARY OF THE INVENTION

Particular embodiments of the present invention include methods of forming a retreaded tire, and retreaded tires formed by such methods, and tire treads for use in performing such methods. Particular embodiment of such methods include providing a tire carcass configured to receive the tire tread along an annular tread-receiving area, the annular tread-receiving area arranged along a radially outer side of the tire carcass, and having a width extending laterally across a width of the tire carcass and a length extending annularly around the tire carcass. Such methods further include providing a pre-cured tire tread. In particular embodiments, such treads include a tread body having a length, a width, and a thickness, the thickness being bounded by a top side and a bottom side of the tread, and a detachable connector arranged within a thickness of the tread between a top void portion and a bottom void portion, the top void portion extending into the tread thickness from the top side of the tread and the bottom void portion extending into the tread thickness from the bottom side of the tread, the detachable connector extending across a width of the top void portion and of the bottom void portion such that the detachable connector is attached to each of a pair of opposing sides of each top and bottom void portion, the detachable connector configured to separate from the tread upon application of a separation force. Further steps of such methods include assembling a retreaded tire by arranging the tire tread atop a bonding layer in an installed configuration, the bonding layer arranged between the tire tread and the tire carcass, and bonding the tire tread to the tire carcass, where a flexible curing membrane is arranged along the top side of the tire tread such that during a step of bonding, the flexible membrane extends into the top void portion from the top side to forcefully engage and displace the detachable connector downward in a direction toward the bottom side. A further step of such methods includes removing the detachable connector from the top void portion after the step of bonding.

Particular embodiments of the tread provide a pre-cured tire tread configured for attachment to a tire carcass to form a retreaded tire. In particular embodiments, such treads include a tread body having a length, a width, and a thickness, the thickness being bounded by a top side and a bottom side of the tread, and a detachable connector arranged within a thickness of the tread between a top void portion and a bottom void portion, the top void portion extending into the tread thickness from the top side of the tread and the bottom void portion extending into the tread thickness from the bottom side of the tread, the detachable connector extending across a width of the top void portion and the bottom void portion such that the detachable connector is attached to each of a pair of opposing sides of each top and bottom void portion, the detachable connector being both configured to be engaged by a flexible curing membrane during a curing operation and configured to separate from the tread upon application of a separation force.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

Figure 3A:
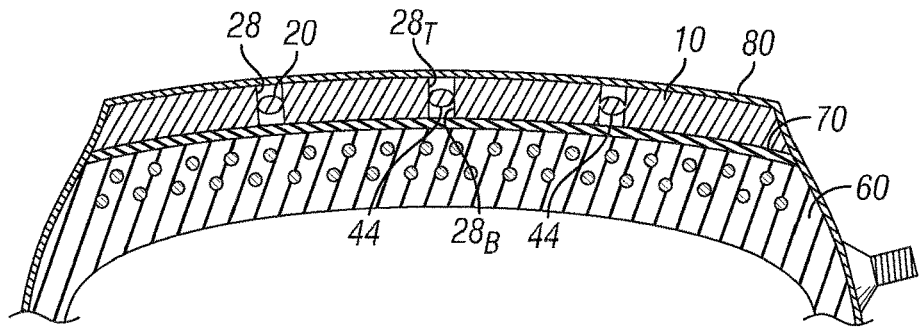
FIG. 3A is a front cross-sectional view of a tire-membrane assembly comprising an assembled retreaded tire and flexible curing membrane arranged at least partially about the tire and along the tire tread to form a sealed fluid chamber, in accordance with a particular embodiment of the invention.
Figure 3B:
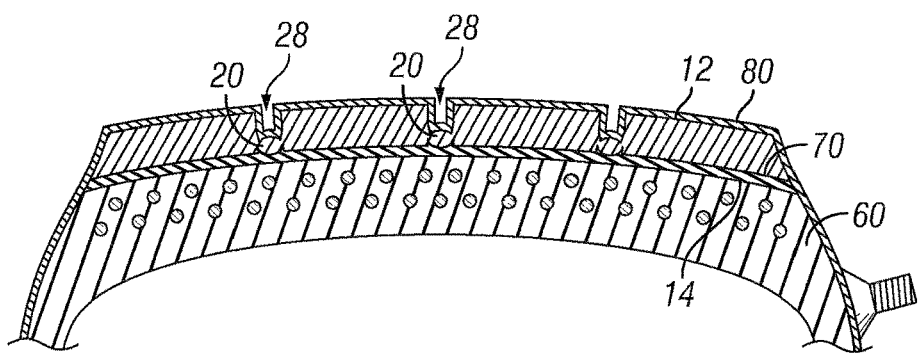

FIG. 3B is a front cross-sectional view of the tire-membrane assembly of FIG. 3A arranged within a curing chamber, the curing membrane collapsed upon the tire tread and extending into each of the plurality of voids containing a detachable connector, whereby the curing membrane forcefully engages the detachable connector and forces the same into the bonding layer arranged between the tread and the tire carcass, in accordance with a particular embodiment of the invention.

Figure 3C:
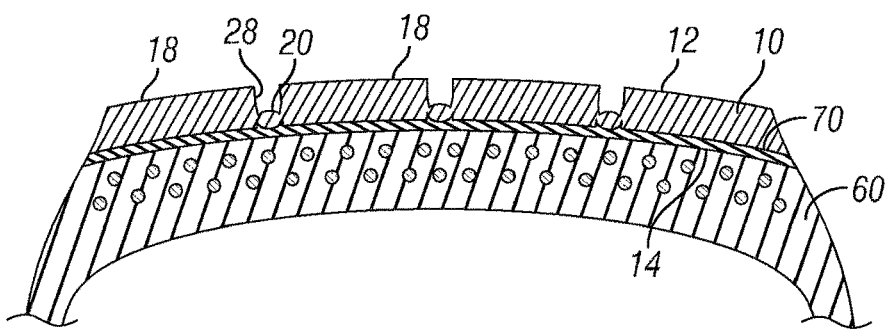

FIG. 3C is a front cross-sectional view of the tire-membrane assembly of FIG. 3B shown at the conclusion of a curing process after the curing membrane has been removed, whereby the detachable connectors remain at the bottom of each void along the bonding layer, in accordance with a particular embodiment of the invention.

Figure 3D:
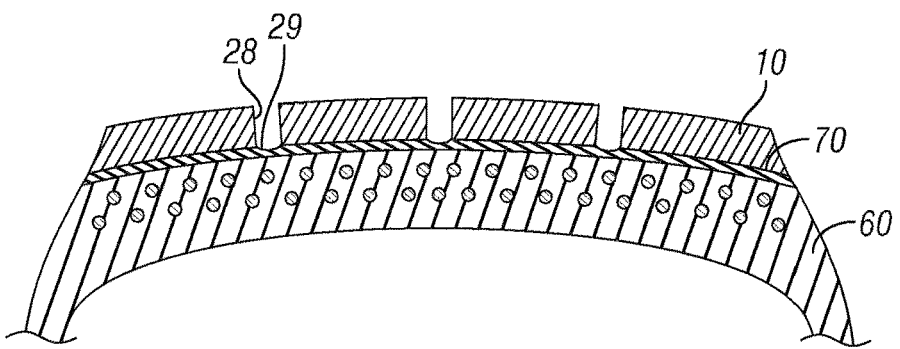

FIG. 3D is a front cross-sectional view of the tire-membrane assembly of FIG. 3C shown after the detachable connectors have been removed from each of the voids, in accordance with a particular embodiment of the invention.

Figure 4A:
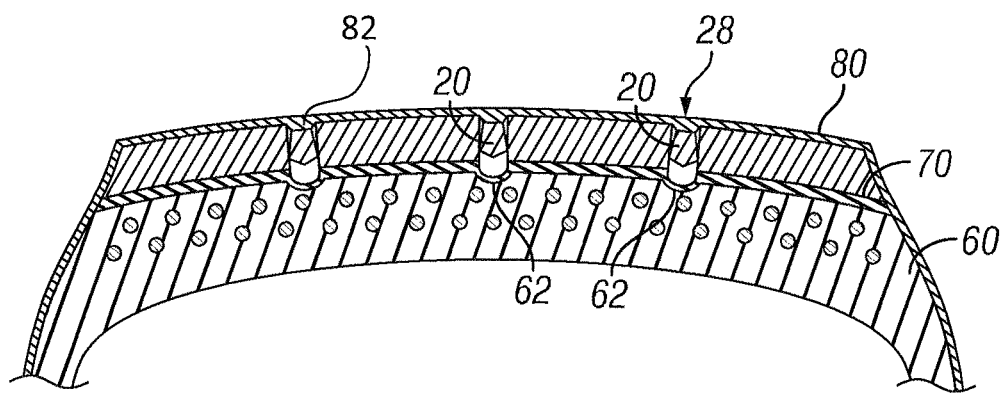

FIG. 4A is a front cross-sectional view of a tire-membrane assembly is arranged within a curing chamber, the curing membrane collapsed upon the tire tread and extending into each of the plurality of voids containing a detachable connector, whereby the curing membrane forcefully engages the detachable connector and forces the same into both the bonding layer arranged between the tread and the tire carcass and a void arranged within the tire carcass below the bonding layer, in accordance with a particular embodiment of the invention.

Figure 4B:
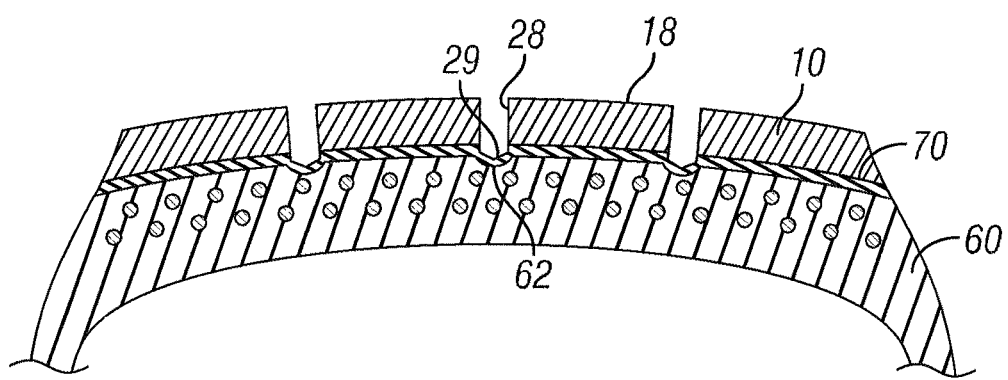

FIG. 4B is a front cross-sectional view of the tire-membrane assembly shown after the detachable connectors have been removed from each of the voids after a curing process, in accordance with a particular embodiment of the invention.

Figure 5A:
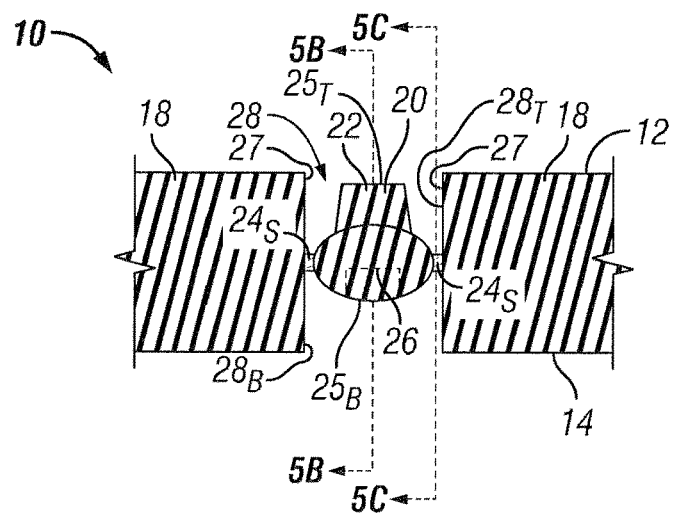

FIG. 5A is a partial front cross-sectional view of a detachable connector arranged within a void of a tire tread, according to a particular embodiment of the invention.

Figure 5B:
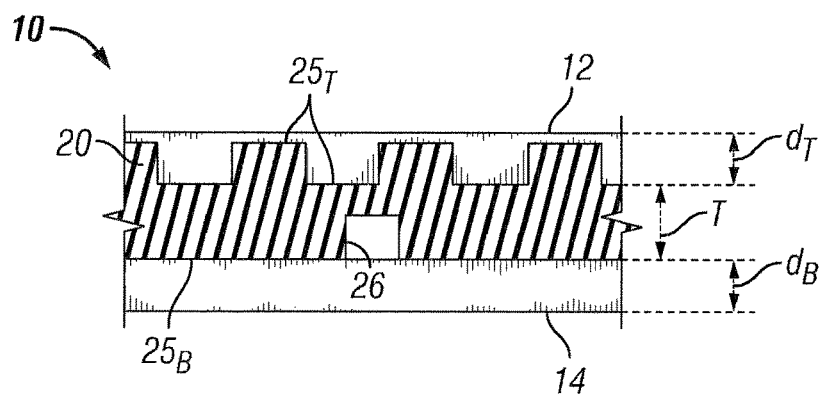

FIG. 5B is a side sectional view of the detachable connector of FIG. 5A taken along line 5B-5B.

Figure 5C:
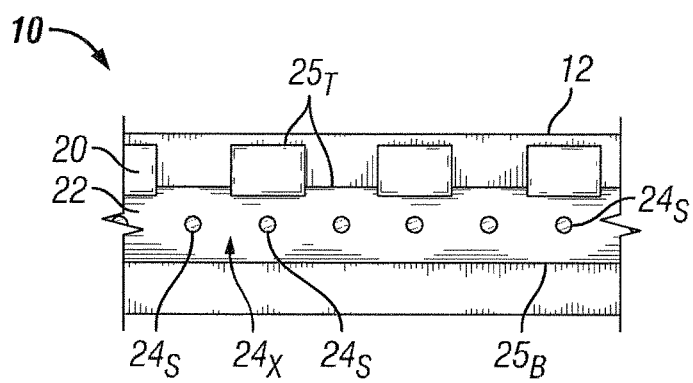

FIG. 5C is a side sectional view of the detachable connector of FIG. 5A taken along line 5C-5C.

Figure 5D:
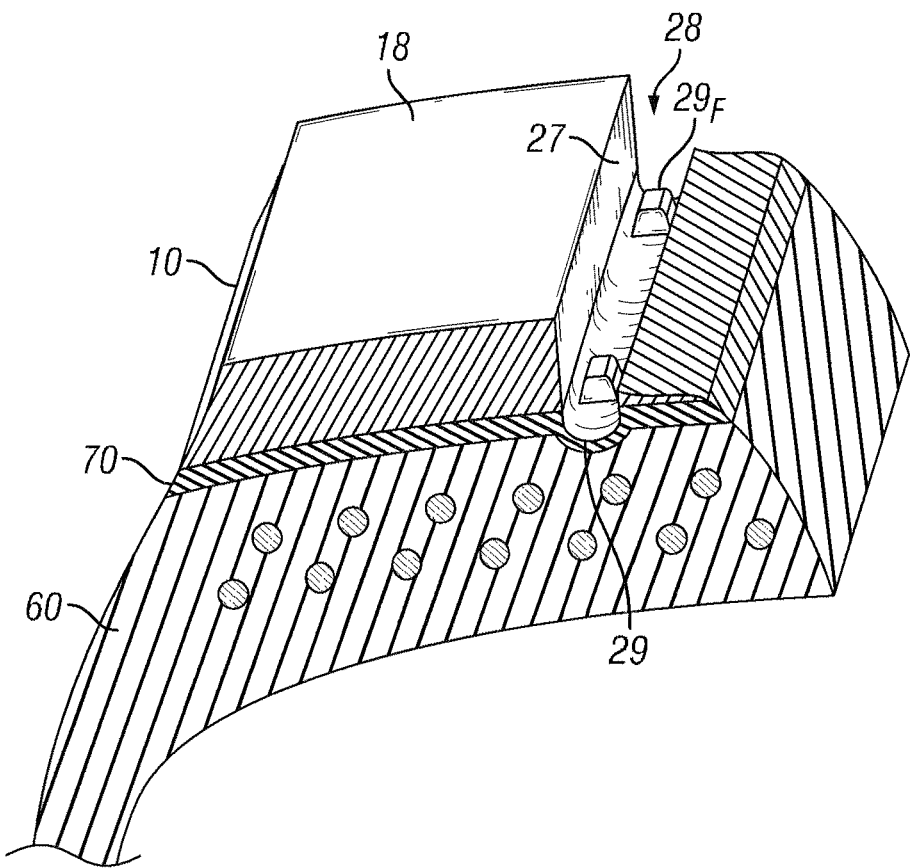

FIG. 5D is a top perspective view of a molded feature formed by a molding cavity arranged along the bottom side of the detachable connector as shown in FIGS. 5A-5B, in accordance with a particular embodiment of the invention.

Figure 6:
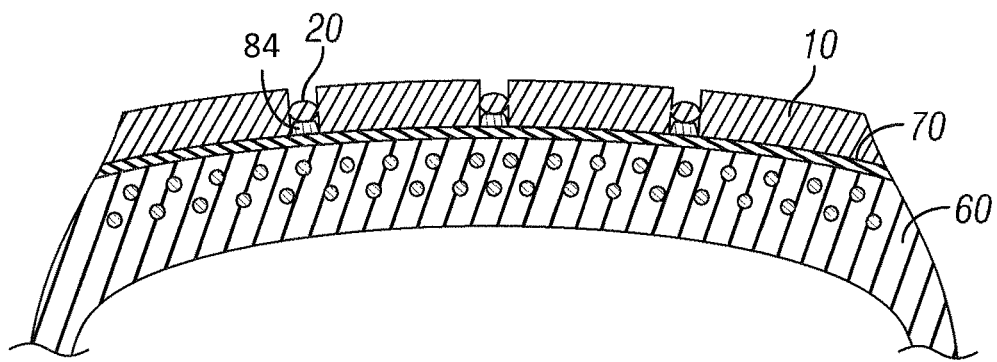

FIG. 6 is a front cross-sectional view of the tire-membrane assembly shown after the tire tread has been aligned along the tire carcass by use of a plurality of guide members, the guide members arranged atop the tire carcass and within each of the voids, in accordance with a particular embodiment of the invention.

Figure 7:
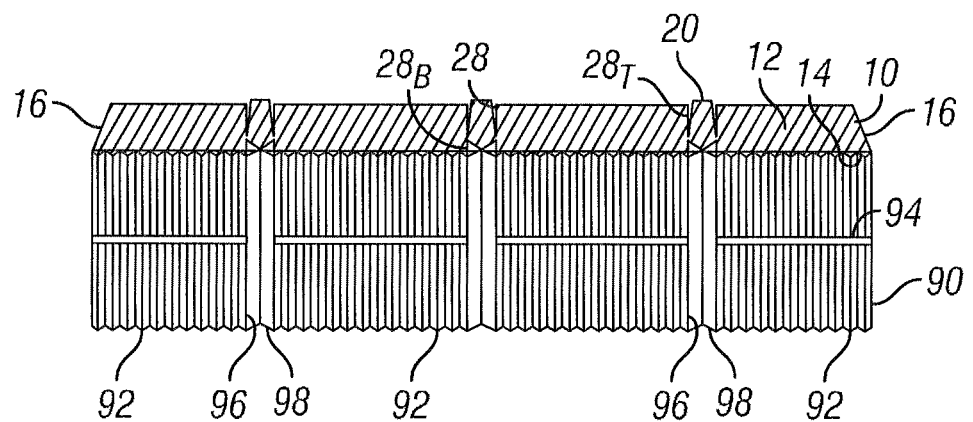

FIG. 7 is a front cross-sectional view of a tire tread having a detachable connector arranged within a void, showing the bottom side of the tread being buffed prior to arranging the tire tread upon the tire carcass, the buffing operation being performed by a buffing member having an insertion member arranged within a bottom of the void, where the insertion member protects the detachable connector from the buffing member, in accordance with a particular embodiment of the invention.

Figure 8:
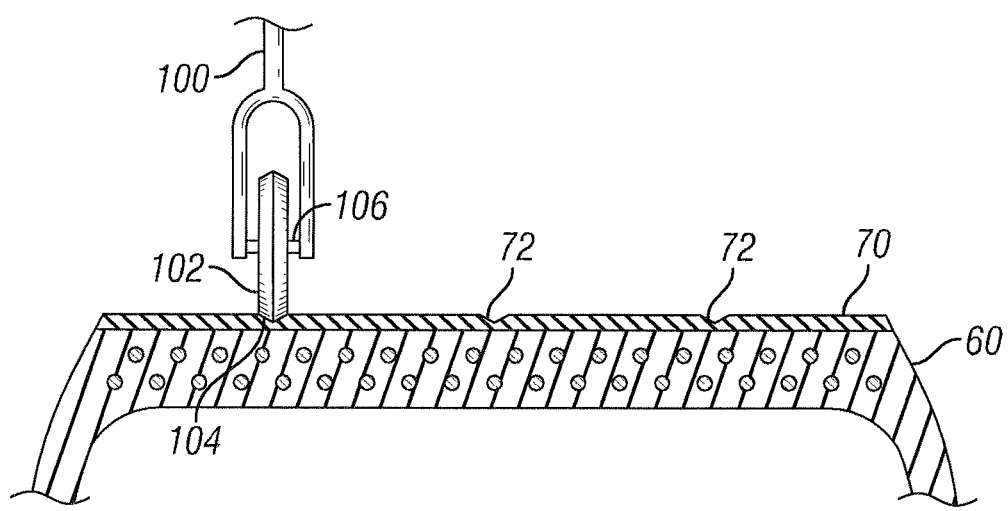

FIG. 8 is a front cross-sectional view of a tire carcass with a bonding layer arranged along the annular tread-receiving area and overtop a plurality of open voids arranged along the annular tread-receiving area, where an impression member is being used to form impressions in the bonding layer, and in particular, overtop each of the open voids, in accordance with a particular embodiment of the invention.

DETAILED DESCRIPTION OF PARTICULAR EMBODIMENTS

Particular embodiments of the invention provide a tire tread, retreaded tires incorporating such treads, and methods for forming a retreaded tire.

With regard to such methods, particular embodiments include the step of providing a tire carcass configured to receive the tire tread along an annular tread-receiving area. The tire carcass generally includes a pair of beads, a pair of sidewalls, body plies, and a belt package if the tire is a radial tire (otherwise, if not including a belt package, the tire is a biased ply tire). The body plies and belt package generally comprise plies of rubber containing strands of reinforcements. When retreading a tire, a used tire carcass is provided, which generally comprises a cured tire having at least a portion of the preexisting tread removed so that a new tread may be attached to the tire carcass to form a retreaded tire. a preexisting tread may comprise a used or new tread, which may comprise an original tread formed with the tire or a retread previously installed on the tire carcass to form a retreaded tire. Commonly, at least a portion of the preexisting tread is removed to a desired depth by performing a buffing or abrading operation. The preexisting tread may be completely or partially removed to form the annular tread-receiving area. The annular tread-receiving area is arranged along a radially outer side of the tire carcass, and has a width extending laterally across a width of the tire carcass and a length extending annularly around the tire carcass. Once prepared, a layer of bonding material (also referred to as a "bonding layer") is arranged along the annular tread-receiving area between tread and the tire carcass to facilitate bonding of the tread to the tire carcass.

Particular embodiments of such methods of forming a retreaded tire comprise the step of providing a pre-cured tire tread comprising a tread body having a length, a width, and a thickness, the thickness being bounded by a top side (also referred to as an "outer side") and a bottom side (also referred to as an "underside") of the tread—or of the tread body. The pre-cured tread includes at least one void extending, or a plurality of voids each extending, within the tread body thickness. Each such void has a width extending in a direction perpendicular to the tread body thickness, and to a length of the void. The pre-cured tread further includes a detachable connector arranged within the void between the top and bottom void portions and extending across the width of the void such that the detachable connector is attached to each of a pair of opposing sides defining the width of the void, the detachable connector being configured to separate from each of the pair of opposing sides upon application of a separation force. The void arranged within the tread can be described as a void extending into the tread body thickness from both the top side and the bottom side. Such a void can be referred to herein as a through-void that extends through the tire tread, except that a detachable connector is arranged therein until its removal after curing the tread to the tire carcass in a curing operation. More particularly, the void comprises a top void portion arranged between the top side of the tread and a detachable connector arranged in the void and a bottom void portion arranged between the bottom side of the tread and the detachable connector, the top void portion extending into the tread thickness from the top side of the tread and the bottom void portion extending into the tread body thickness from the bottom side of the tread body. In such instances, the detachable connector can be described as being arranged within a thickness of the tread between a top void portion and a bottom void portion, the top void portion extending into the tread thickness from the top side of the tread and the bottom void portion extending into the tread thickness from the bottom side of the tread, the detachable connector extending across a width of the top void portion and of the bottom void portion such that the detachable connector is attached to each of a pair of opposing sides of each top and bottom void portion. It is understood that the void may comprise any desired groove-having a length being greater than its width and extending in a direction perpendicular to a direction of the void width and to a direction of the tread body thickness. It is appreciated that the detachable connector arranged within the void may extend along a length of the void continuously or discontinuously. Moreover, it is appreciated that each void may include a plurality of detachable connectors spaced apart along a length of the void.

In particular embodiments, the void may comprise any known longitudinal groove or lateral groove. A longitudinal groove generally extends in a direction of the tread length, which may extend in a direction of, or parallel to, a lateral centerline of the tread extending in a direction length (where the longitudinal centerline extends in a longitudinal direction of the tread within a plane perpendicular to the rotational axis of the tire) or at another angle biased to the longitudinal centerline. A lateral groove generally extends in a direction of the tread width, which may extend in a direction perpendicular to a longitudinal centerline of the tread or at another angle biased to the longitudinal centerline. In any event, the length of any void may extend linearly or non-linearly along any non-linear path. It is also appreciated that each of the pair of opposing sides defining the void width may taper inward to form a narrowing width as the void extends deeper into the tread thickness from the top side. It is also contemplated that each of the pair of opposing sides defining the void width may taper inward to form a narrowing width as the void extends into the tread thickness from the bottom side towards the top side. Still, any combination of each prior scenario may occur. For example, in particular embodiments, the void width narrows as the void extends into the tread thickness from the top side until reaching the depth of the detachable connector and where the void width extends into the tread thickness from the bottom side and narrows until reaching the depth of the detachable connector. In this example, it can also be said that the top void portion narrows in width from the top side to the detachable connector, while the bottom void portion narrows in width from the bottom side to the detachable connector.

The detachable connector is referred to as detachable because it is configured to separate or detach from the tread upon applying a separation force to the connector, whereby the separation force causes the detachable connector separate or detach (i.e., rip or tear) from the tread. It is understood that the separation force may comprise pushing or pulling the detachable connector, of which may occur prior to or after the tire tread is attached to the tire carcass. For example, in particular embodiments discussed further below, the detachable connector is at least partially detached from the tread by virtue of a curing membrane pushing downward upon the detachable from the top side of the tread, and/or at least partially by operation of pulling the detachable connector from the top side of the tread. Each of these embodiments are discussed further herein. In detaching the detachable connector from the tread, in particular embodiments, the detachable connector is configured to separate from at least one or both of the pair of opposing sides of the void.

It is appreciated that separation of the detachable connector from the tread may be a controlled separation or break. For example, in particular embodiments, each detachable connector includes a relatively thin location on each opposing side of the detachable connector associated with each of the pair of opposing sides of the void, each of the thin locations extending in a direction of the connector length or in a direction of the void length. In particular embodiments, the thin locations are arranged adjacent to, or near, each of the opposing sides of the void. To further promote a controlled break, in further embodiments, each detachable connector include one or more voids arranged in spaced relation along a length of the detachable connector, extending in a direction of the void length. The one or more voids may comprise, for example, apertures, such as holes or gaps, or even perforations. The arrangement of one or more voids may be said to comprise a plurality of voids arranged in an array along a length of the detachable connector. It is appreciated that the arrangement of one or more voids may be separate from, or in addition to the use of the thin portions to control the breaking of the detachable connector from the tread. For example, in certain embodiments, the thin portions include an arrangement of one or more voids to promote controlled breaking along each of the thin portions. In addition to controlling the breaking of the detachable connector, the existence of discontinuities along any connector allows a bottom of the void to vent into a top portion of the void to alleviate any pressure differential on opposing sides of the detachable connector within the void during curing operations.

It can be said that the detachable connector connects adjacent tread elements comprising ribs or lugs. Tread elements, as defined herein, generally comprise a mass of tread material defined by one or more voids extending into the tread thickness. For example, in particular embodiments, a tread element comprises a rib generally comprise a mass of tread extending continuously in a direction of the tread length, and circumferentially around the tire when the tread is mounted on the tire carcass. The rib is generally defined by pair of spaced apart longitudinal grooves, or a longitudinal groove and a lateral side edge of the tread (i.e., one of a pair of spaced apart side edges defining the tread width). By further example, in certain embodiments, a tread element comprises a lug, which is a mass of tread generally defined by a pair of spaced apart lateral grooves intersecting a pair of spaced apart longitudinal grooves, or a longitudinal groove and a lateral side edge of the tread (i.e., one of a pair of spaced apart side edges defining the tread width). Tread elements may include a tire operating surface arranged along the top side of the tread.

In particular embodiments, to facilitate separation of the detachable connector from each of the pair of opposing sides, thin portions of the detachable connector are arranged close to each of the pair of opposing sides to define a separation or detachment locations. In such instances, the detachable connector comprises a central portion arranged between a pair of connecting portions, each of the pair of connecting portions extending between the central portion and one of the void sides and having a thickness less than the central portion. The central portion generally comprises the substantial portion of the detachable connector by mass. It is the connection portions that generally attach the detachable connector to each of the opposing sides of the void. In such embodiments, each of the pair of connecting portions form one of the thin portions discussed above. As such, each of the connecting portions are configured to break or fracture, such as by ripping or tearing. Each connecting portion may deform when initially engaged by a flexible curing membrane. Partial or complete separation may occur due to the continued forceful engagement with the flexible curing membrane, or may occur or be completed when pulled from the tread after performing a curing operation.

In particular embodiments, the detachable connector, when arranged within the through-void or between the top and bottom void portions, the detachable connector is also configured to be engaged by a flexible curing membrane during a curing operation. This is in addition to being configured to separate from the tread. As discussed herein, this engagement may operate as the separation force, or may instead, or additionally, operate to forcefully engage a bottom side of the detachable connector into a bonding layer arranged below the tread and along a tire carcass.

With regard to the pair of connecting portions, it is appreciated that each of the connection portions may comprise a continuous structure extending along a length of the void, a length of the central portion, or a length of the detachable connector. To control the breaking of each connector, however, by rendering the breaking easier, in particular embodiments, one or more discontinuities (or a plurality of discontinuities) are formed or arranged along the length of at least one of, or both of, the pair of connecting portions. In further embodiments, the one or more discontinuities form a plurality of segments spaced apart along a length of the connecting portion. During the step of bonding, the existence of discontinuities along each connector also allows the bottom void portion of the void to vent into the top void portion to alleviate any pressure differential between the top and bottom void portions when the bottom void portion is not in fluid communication with a lateral side of the tread. It is appreciated that the one or more discontinuities may be formed by a process after the tread has been molded, or during the molding operation. For example, in certain embodiments, each of the plurality of one or more discontinuities are formed by perforating each connecting portion one or more instances in spaced relation along a corresponding connecting portion. A perforation may comprise, for example, a slit, cut, aperture, or hole, formed by puncturing, stamping, pressing, pinching, or lacerating a corresponding connecting portion. In further embodiments, the plurality of segments are molded into the tread body.

While the detachable connector may comprise any desired shape, it can be said that the detachable connector is shaped to facilitate contact with flexible curing membrane. While the detachable connector may deform as much as capable by the flexible curing membrane, in particular instances when the flexible curing membrane is unable to substantially extend into the depth of the void, the top side of the flexible connector may be arranged in close relation to, co-planar with, or even above the top side of the tread (that is, relative the adjacent tread elements to which the detachable connector is attached). Likewise, in such instances, it may also be desired to limit the deformation or travel needed by connector to reach and engage the bonding layer.

Because, in certain embodiments, the detachable connector will forcibly engage the bonding layer arranged at the bottom of the tread void during the step of bonding, by virtue of the flexible curing membrane, in particular embodiments, a bottom side of the detachable connector includes an impression surface configured for forming an impression within the bonding layer. This impression surface is configured to form any desired shape or contour in relief into the bonding layer, such as a V-shaped or U-shaped contour, for example. In further embodiments, the bottom side of the detachable connector contains a molding cavity configured for forming a molded feature in the bonding layer. For example, the molded feature may comprise a wear indicator or stone ejector.

It is understood that the detachable connector, and any of the pair of connecting portions, may be formed of any desired material. In particular embodiments, the detachable connector is formed of tread material, that is, of elastomeric material, such as natural or synthetic rubber, that is molded and cured with the tread. Accordingly, in particular embodiments, the detachable connector is molded with the tire tread.

Before the retreaded tire is assembled, in particular embodiments, a release agent is arranged along a bottom side of the detachable connector, where the release agent is configured to prevent substantial bonding between the detachable connector and the bonding layer should the detachable connector and the bonding layer come into contact during the curing process. In particular embodiments, the release agent is a fluid composition applied to the bottom side of the detachable connector, such as any mold release known to one of ordinary skill in the art, for example. It is appreciated that the release agent used in tread or tire mold operations may be employed for application to the bottom side of the detachable connector. In other embodiments, the release agent comprises a strip of material, such as tape, having properties configured to prevent substantial bonding between the detachable connector and the bonding layer. A release agent 44 is exemplarily shown arranged along a bottom of the detachable connector in FIG. 3A.

Also, before the retreaded tire is assembled, the bottom side of the tread may be prepared for bonding. For example, any contaminants or foreign matter is removed and the bottom side is roughed to facilitate sufficient adhesion and bonding of the tread to the tire carcass. To accomplish this, a rotary buffing member configured to abrade the bottom side of the tread is employed. In particular embodiments, to prevent abrading portions of the rotary buffing member from extending into the void bottom and potentially damaging the detachable connector, an insertion member configured to be inserted into the void from the bottom side of the tread is arranged on the rotary buffing member. The insertion member protects the detachable connector by covering the detachable connector or by otherwise preventing access of the rotary buffing member to the detachable connector. In particular embodiments, however, the insertion member is configured to deflect the detachable connector further into the void away from the bottom side. It is understood that the insertion member may comprise any structural member configured to be inserted into the tread void. In particular embodiments, the insertion member is configured to better allow the buffing member to translate along the bottom side during buffing or abrading operations. For example, in such instances, the insertion member comprises a rotatable disk or wheel, which may be freely rotatable or driven.

Particular embodiments of the methods discussed herein include the step of assembling a retreaded tire by arranging the tire tread atop a bonding layer in an installed configuration, the bonding layer arranged between the tire tread and the tire carcass. During retreading operations, the tire tread (i.e., the "retread") is arranged upon the tire carcass. When the tire tread comprises a strip of tread, such as when molded in a flat mold, for example, the tread is wrapped around the tire carcass. When the tire tread is an annular tread band, the tread band is positioned around the tire carcass, where the tire carcass is arranged within a central opening of the tread band. It is appreciated that the bonding layer may comprise any bonding material known to one of ordinary skill used for bonding the pre-cured tire tread to a tire carcass. For example, the bonding material may comprise any elastomeric or polymeric material, such as natural or synthetic rubber, which is curable and promotes bonding by way of cross-linking. In particular embodiments, in performing the step of assembling, the bonding layer comprises uncured bonding material.

In particular embodiments of such methods, an impression member may be used during the step of assembling to pre-form an impression along the bonding layer at a location where the void in the tread will be arranged overtop prior to arranging the tread atop the bonding layer, which is uncured. Because the void of the tread may be arranged overtop an open tire carcass void, in particular embodiments, the impression is formed overtop, and even extending into, an open void arranged along the annular tread-receiving area of the tire carcass (also referred to herein as the "open tire carcass void"). Forming the impression in the bonding layer with the impression member operates in conjunction with a detachable connector to form a final impression having a total depth that not only includes the depth of the impression formed by the impression member but also a secondary impression formed by the detachable connector when, during the step of bonding, the connector forcibly engages the bonding layer and the pre-existing impression formed by the impression member. The impression member may include any impression surface having a relief of any desired shape or contour configured to form any desired impression into the bonding layer. For example, the impression surface may provide in relief a desired profile for the bottom of any void, such as V-shaped or U-shaped contour, for example. It is appreciated that the impression member may comprise any structure or apparatus configured to form an impression in the bonding layer. For example, in particular embodiments, the impression member is a rotational member, such as a wheel, which rolls along the bonding layer to continuously form impressions along the bonding layer, where the impression surface is arranged along the outer circumference of the rotational member. It is also appreciated that in other embodiments, the impression member may comprise a non-rotational member, such as a stamp, which is pushed into the bonding layer and subsequently lifted to form an impression in the bonding layer.

In certain embodiments, the step of assembling includes arranging a guide member along the tire carcass atop the bonding layer and subsequently arranging the tread atop the bonding layer and the guide members. In particular, when applying the tread, each of the guide members are received by each of the voids arranged in the tread, and more specifically, by the bottom void portion of each void in the tread. Accordingly, such steps include arranging the guide member within a bottom void portion of the void while the guide member is arranged atop the bonding layer. It is appreciated that the guide members may be retained in a desired position by the adhesiveness of the bonding layer. It is also appreciated that each guide member may be arranged over top an open tire carcass void, or even within the open tire carcass void when the bonding layer also extends into the open tire carcass void. In certain embodiments, each of the guide members are arranged within an impression formed by an impression member. In any event, the guide members may be arranged manually or automatically in pre-determined positions. The guide members may be made from any material suitable for its intended purpose. Because each of the guide members will remain in the assembled retread tire during the step of bonding, —unless arranged along and open to a lateral side of the tread where it can be removed prior to curing, each of the guide members are to be provided such that each does not substantially bond (that is, does not permanently bond) to the tire. Therefore, in particular embodiments, the guide members are formed of a material or coated with a material that will not substantially bond with the tire, and in particularly with the bonding layer. For example, the guide member may be formed of pre-cured polymeric or elastomeric material, such as natural or synthetic rubber (such as tread material) or plastic, which may or may be coated with a release agent (more specifically defined elsewhere herein). In such instances each guide member may be removed after the step of bonding with the detachable connector.

A further step of particular embodiments of such methods comprises bonding the tire tread to the tire carcass. In particular embodiments, the step of bonding comprises a step of curing, whereby a flexible curing membrane is arranged along the top side of the tire tread such that during a step of bonding, the flexible membrane extends into the void from the top side to forcefully engage and displace the detachable connector downward into the void in a direction toward the bottom side. In arranging a flexible curing membrane about at least a portion of the tread of the assembled retreaded tire to form a sealed fluid chamber between the flexible curing membrane and the tire (including the tire tread). When assembled, the flexible curing membrane and the tire form a tire-membrane assembly. It is appreciated that the flexible curing membrane maintains proper alignment of the new tread relative to the tire carcass. The membrane also facilitates a pressure differential between the membrane compartment (and the sealed tire assembly) and a curing chamber of the curing vessel, within which the tire-membrane assembly is arranged to cure the tread to the tire carcass by application of heat and/or pressure according to any desired curing law. It is appreciated that any step concerning the step of bonding in performing the methods discussed herein, may also apply when the step of bonding comprises a step of curing.

It is appreciated that the flexible curing membrane may comprise any flexible membrane for curing a tire that is known to one of ordinary skill in the art, which may comprise one or more curing membranes arranged about the tire. For example, a membrane may extend substantially around the entire tire, the membrane comprising one or more sections. By further example, the assembled retreaded tire may be mounted on a wheel and one or more curing membranes arranged to extend from the wheel and about assembled retread tire and the tread arranged thereon. In such example, an flexible curing membrane extends along the top side of the tire tread and down each of the pair of tire carcass sidewalls to engage the wheel to form a sealed fluid chamber between the membrane and the tire along the tread and sidewalls. A second sealed fluid chamber is then formed between the interior side of the tire carcass and the wheel.

The retread curing process is performed generally within a curing vessel, such as, for example, an autoclave. The curing vessel generally includes a curing chamber providing a controlled environment in which the tire-membrane assembly cured. Generally during the curing process, the chamber is pressurized to a desired pressure and heated to a desired temperature based upon a recipe or formula. In performing the step of bonding or curing, particular embodiments of such methods include placing the sealed fluid chamber of the tire-membrane assembly under at least partial vacuum. This generally occurs at the beginning of the curing process, before pressure and heat is applied to the tire-membrane assembly in a curing chamber of a curing vessel. As used herein, "vacuum" or "under vacuum" means providing a fluid pressure equal to zero psia (pounds per square inch absolute), and "substantial vacuum" or "substantially under vacuum" means 5 to 0 (zero) psia. "Partial vacuum" connotes a pressure less than 14.7 psia, less than 10 psia, less than 8 psia, less than 5 psia, or less than 3 psia. Additional steps of such methods may further include connecting a fluid passage to the curing membrane of the tire-membrane assembly to place the sealed fluid chamber in fluid communication with a pressure source (configured to provide positive pressure and/or vacuum pressure as needed). A pressure source may comprise a compressor or any other device known to one of ordinary skill in the art.

Subsequent to placing the sealed fluid chamber of the tire-membrane assembly under at least partial vacuum, and while the tire-membrane assembly is under at least partial vacuum, the curing chamber of the curing vessel in which the tire-membrane assembly is arranged is pressurized with a positive pressure above atmospheric pressure. In doing so, a pressure differential is established between the curing chamber and the sealed fluid chamber arranged between the curing membrane and the tire, and the curing membrane collapses upon the tire tread such that the pressure surrounding the curing membrane within the curing chamber is transferred through the membrane and to the tire tread. Accordingly, the flexible membrane is forced into the void arranged along the top side of the tread and against the detachable connector, which is forced further into the void toward the bottom side. This occurs not only by way of the forceful engagement of the membrane, but also because of the pressure differential between the substantial vacuum within the sealed fluid chamber and the positive pressure of the curing chamber in which the tire-membrane assembly is arranged, where the substantial vacuum pressure assists or facilitates the downward movement of the detachable connector by providing less resistance and even pulls the detachable connector downward.

Due to the ability of the curing membrane to extend into the void from the top side during the step of bonding or curing, and forcefully engage and displace the detachable connector downward into the void in a direction toward the bottom side during the step of bonding or curing, the detachable membrane may partially or fully separate from the tread, or may deform while remaining partially or fully attached to the tread and the pair of opposing sides of the void. Accordingly, in particular embodiments, the flexible membrane at least partially separates the detachable connector from each of the pair of opposing sides of the void. In other embodiments, the flexible membrane substantially separates the detachable connector from each of the pair of opposing sides of the void.

In particular embodiments, to assist the membrane in engaging a detachable connector arranged within a void, the curing membrane has a thickened portion, such as a ridge or rib, for example, arranged along an interior side of the membrane, the thickened portion being configured to extend into the void from a top side of the tread to engage the detachable connector—before and/or during the step of bonding. By doing so, the curing membrane may better reach and engage the detachable connector during the curing operation. It is understood that this thickened portion may have a variable thickness and may be continuous or discontinuous along a length of the void or any detachable connector arranged therein. Furthermore, the thickened portion may comprise any cross-sectional shape across a width of the thickened portion.

Whether the remaining fully or substantially connected to the pair of opposing sides of the void, or partially or fully separating the detachable connector from each of the pair of opposing sides of the void, in particular embodiments, the detachable connector contacts and forcefully engages the bonding layer arranged below the void as the curing membrane forcefully engages and displaces the detachable connector downward during the step of bonding. Accordingly, in particular embodiments, a bottom side of the detachable connector engages the bonding layer, at a bottom of the void along the bottom side of the tread body. In more specific embodiments, in engaging the bonding layer, the bottom side of the detachable connector imprints a relief into the bonding layer. This relief may comprise an impression or a molded surface or feature of any desired design or shape. For example, the bottom side of the detachable connector may be shaped such that the relief formed in the bonding layer may form an impression comprising a V-shaped or U-shaped contour. By further example, in particular embodiments, the impression imprinted into the bonding layer is a molded feature extending outwardly from the bonding layer and into the void. In particular embodiments, the molded feature is a wear indicator, such as a wear bar, or a stone ejector. Therefore, more generally, in particular embodiments, the bottom side of the detachable connector contains a molding cavity configured for forming a molded feature in the bonding layer. In even more general terms, the bottom side of the detachable connector includes a desired configuration configured for forming a relief within the bonding layer.

In certain embodiments, the tire carcass includes one or more voids arranged along the annular tread receiving area. While each of the one or more voids may comprise any void, in particular embodiments, each of the one or more voids comprise a groove, whether a lateral or longitudinal groove originally formed, or newly formed, into a pre-existing layer of tread in the tire carcass. In instances when the curing membrane forces the detachable connector downwards to engage the bonding layer, according to particular embodiments, the detachable connector is also forced into or arranged within a void arranged along the annular tread receiving area of the tire carcass, below the void arranged in the tire tread and the bonding layer arranged between the tire tread and the tire carcass. For example, a void may be formed into the tread-receiving area of the tire carcass, or a pre-existing void in the tread-receiving area may be expanded or reduced by any abrading or cutting operation. The detachable connector may also be forced into a void formed into the bonding layer, such as an impression discussed further herein.

A further step of particular embodiments of such methods comprises removing the detachable connector from the void after the step of bonding. After the retreaded tire is substantially cured and the tread bonded to the tire carcass, the tire-membrane assembly is disassembled and the flexible curing membrane removed from the tire. Subsequently, the detachable connector is removed from the void, and therefore the tire. Upon removal of the flexible curing membrane, the detachable connector may already be partially or fully (i.e., completely) separated from each of the opposing sides of the void by virtue of the curing membrane pushing downward on the detachable connector during the step of bonding. In the case where the detachable connector is partially separated from each of the opposing sides, or not separated at all, a separation force is applied to the detachable connector to pull the detachable connector from the void. In doing so, the detachable connector is completely separated or torn from the void, and therefore the tire. For example, the separation force may be applied by pinching, grasping, or impaling the detachable connector with any removal tool configured to remove the detachable connector, which may be performed manually or automatically. It is also understood that the separation force may comprise a shearing force, which may form one or more cuts or slices into the detachable to facilitate removal of the detachable connector by creating one or more discontinuities in the detachable connector. The discontinuities may assist with the application of another separation force, such as a pulling force, or may completely separate the detachable connector from the tread without the assistance of any other separation force.

Particular embodiments of the methods discussed above will now be described in further detail below in association with the figures filed herewith exemplifying the performance of the methods in association with particular embodiments of the tread.

Figure 1:
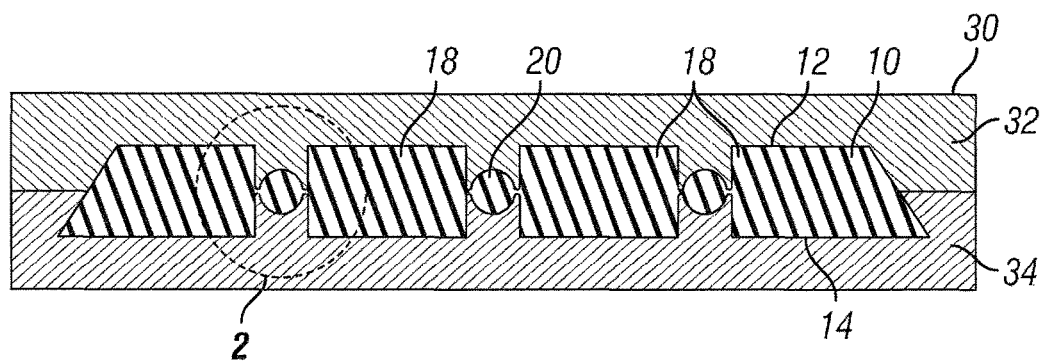
FIG. 1 is a front cross sectional view taken laterally across a tread mold forming a precured retread tire tread, the tread having one or more detachable connectors arranged within a void or void feature extending into the tread thickness from both a top and bottom side of the tread, in accordance with an embodiment of the invention.
Figure 2:
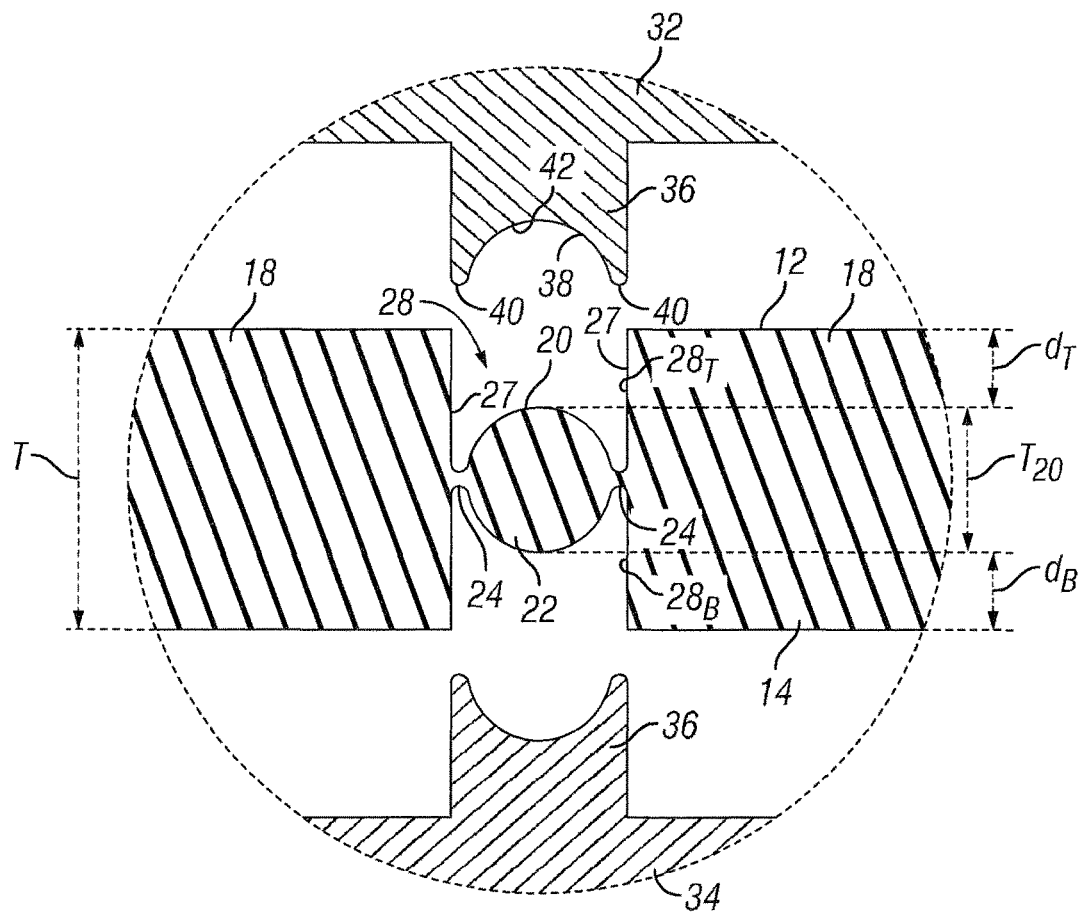
FIG. 2 is an exploded view of the region identified as Section 2 in FIG. 1, where the mold is shown separated from the pre-cured, molded tread.

With reference to an exemplary embodiments in FIGS. 1 and 2, a tread 10 is shown arranged in a mold 30 while undergoing a molding operation. In FIG. 1, the tread 10 is arranged within a closed mold 30 while in FIG. 2 a portion of the tread 10 is shown separated from the mold in an expanded view.

Generally, the tread 10 includes a tread body having a length (not shown), a width W, and a thickness T, the thickness being bounded by a top side 12 and a bottom side 14 of the tread. The width W is defined by a pair of opposing lateral sides 16. The tread 10 also includes a void 28 referred to as a through-void, extending into the tread body thickness T from the top side 12 to a detachable connector 20, and from the bottom side 14 to the detachable connector, which may be unitary or formed of multiple portions. The through-void includes a width extending $W_{28}$ in a direction transverse to the tread body thickness and to the tread body length. In the embodiment shown, the through-void is a longitudinal void, although in other embodiments, the through-void comprises or includes a lateral void.

The detachable connector 20 arranged within the void 28 extends across the width $W_{28}$ of the void such that the detachable connector is attached to each of a pair of opposing sides 27 defining the width of the void. The detachable connector 20 is configured to separate from the tread, such as from each of the pair of opposing sides 27 or along the detachable connector itself, upon application of a separation force. In separating from the tread, in certain embodiments, a portion of the detachable connector may remain extending any of the opposing sides 27. It is appreciated that the detachable 20 connector may be located at any depth of the through-void 28. Therefore, the detachable connector may be located along the top side 12 of the tread, the bottom side 14 of the tread, or at any location there between as generally shown.

The through-void 28 may be described as a void extending through the tread thickness T and having a detachable connector 20 arranged within the through-void, in particular embodiments, such as the embodiment shown, the through-void 28 can also be described as comprising a top void portion $28_T$ arranged between the top side 12 of the tread and the detachable connector 20 and a bottom void portion $28_B$ arranged between the bottom side 14 of the tread and the detachable connector 20, the top void portion extending into the tread thickness T from the top side of the tread or tread body and the bottom void portion extending into the tread body thickness from the bottom side of the tread or tread body. In such embodiments, the through-void 28 may also be described as a pair of voids separated by a detachable connector, where the first of the pair of voids is a top void and the second of the pair is a bottom void. The top void is arranged between the top side of the tread and the detachable connector and the bottom void is arranged between the bottom side of the tread and the detachable connector, the top void extending into the tread thickness from the top side of the tread body and the bottom void extending into the tread body thickness from the bottom side of the tread body.

It is appreciated that the detachable connector may comprise any desired shape. However, it can be said that the detachable connector is shaped to facilitate contact with flexible curing membrane, for the purpose of forcing the detachable connector into engagement with the bonding layer and/or for the purpose of separating the detachable connector from the tread. Accordingly, the detachable connector may be sufficiently located within the depth of the void relative the top side of the tread. For example, with reference to FIG. 2, the detachable connector 20 is formed a distance $d_T$ from the top side 12 of the tread 10. Distance $d_T$ is also referred to the depth by which the connector extends into the void 10. In particular exemplary embodiments, the detachable connector 20 is arranged a distance $d_T$ from the top side substantially equal to or less than 3 millimeters (mm) or substantially equal to or less than 2 mm, although greater or smaller distances may be employed to achieve the intended purpose. Furthermore, with continued reference to the exemplary embodiment of FIG. 2, in embodiments where it is desired that the detachable connector 20 contact a bonding layer arranged atop the tire carcass, the detachable connector is sufficiently arranged in close relation to the bottom side 14 of the tread 10. While the detachable connector maybe formed flush with the bottom side or even formed to extend outwardly from the void beyond the bottom side, in particular embodiments exemplified in FIG. 2, the detachable connector 20 is offset from the bottom side 14 within the void 28 by a distance $d_B$. In particular exemplary embodiments, the detachable connector 20 is arranged a distance $d_B$ from the bottom side equal to or less than 3 millimeters (mm) or equal to or less than 2 mm. It is understood that other distances, greater or smaller may be employed to achieve the intended purpose.

While it is appreciated that the detachable connector may comprise any shape or design, in the embodiment shown in FIGS. 1 and 2, the detachable connector 20 comprises a central portion 22 arranged between a pair of connecting portions 24, each of the pair of connecting portions extending between the central portion and one of the void sides 27. The central portion is also shown to be thicker than the connecting portions, which are thinner to control the location at which the detachable connector separates from the tread. In fact, in the embodiments shown in FIGS. 3A-3D and 4A-4B, each of the detachable connectors 20 separate (that is, fracture, rip, or tear, for example) along each of the connecting portions 24, such that a portion of each connecting portion may, or may not, remain attached to a corresponding side of the void after the detachable connector separates from the void.

With continued reference to FIGS. 1 and 2, mold 30 includes a molding cavity 35 formed by top and bottom segments 32, 34, the molding cavity being configured to form the tread 10. Of particular note, void-forming members 36 extend from each of a top and a bottom segment 32, 34. Each of the void-forming members have a terminal end 38 configured to cooperatively form a detachable connector within the formed void. In the embodiment shown, each terminal end 38 includes a recess 42 arranged between a pair of protrusions 40. The recesses are configured to cooperatively form a central portion of the detachable connector, while the pairs of protrusions are configured to cooperatively form each of the connecting portions of the detachable connector. In the embodiment shown, the mold includes top and bottom segments 32, 34 to form the molding cavity, although additional segments may be employed in other embodiments. It is appreciated that the tread may be molded to form a strip of tread having a length defined by a pair of terminal ends, or may be molded to form an annular band.

As discussed in association with the methods above, after a tread is arranged atop a tire carcass to form a retreaded tire assembly, a flexible curing membrane is arranged at least partially about the tire and along the tire tread to form a sealed fluid chamber for use in curing the tread to the tire carcass. With reference to the embodiments shown in FIGS. 3A-3B, the flexible curing membrane 80 is shown arranged along the tread 10 during curing operations. In particular, in FIG. 3A, the flexible curing membrane 80 is shown initially installed along the assembled tire.

In the embodiment of FIG. 3B, the flexible curing membrane 80 is shown during curing operations extending into the through-void 28 from the top side 12 of the tread 10 and forcibly engaging the detachable connector 20. In the embodiment shown, the flexible curing membrane 80 also forcibly engages a detachable connector 20 to sufficiently cause the detachable connector to form an impression within (that is, to shape) the bonding layer 70. The impression or shaped bonding layer best shown in FIG. 3D, where the detachable connector 20 has been removed to expose the shaped portion 29 of the bonding layer, after the flexible curing membrane 80 has been removed from the retreaded tire at the conclusion of the curing operation. It can be said that the impression or shaped portion 29 of the bonding layer 70 forms a bottom end of the through-void 28, which is a U-shaped impression in the embodiment shown. Formation of the impression may occur by simply deflecting the detachable connector and without completely or partially separating the detachable connector from the tread. In fact, in the embodiment shown, the flexible curing membrane 80 does not provide a sufficient force to separate the detachable connector from the tread 10. In other embodiments, however, the flexible curing membrane forcibly engages the detachable connector to sufficiently cause the detachable connector to at least partially, substantially, or completely separate the detachable connector from the tread. It is noted that a curing membrane may include a thickened portion configured to be aligned with and extend into the void along a top side of the tread, such as is exemplarily shown in FIG. 4A as element 82, to further assist in sufficiently engaging the detachable connector during curing operations. By doing so, the detachable connector 20 may be arranged deeper into the void by increasing distance $d_T$.

It has been discussed herein that the bonding layer may be shaped when the detachable connector forcibly engages the bonding layer at the bottom of the void, such as discussed in association with FIG. 3B by example. In an exemplary embodiment shown in FIG. 4A, while forcibly engaging the bonding layer 70, the detachable connector also extends into an open void 62 arranged along an annular tread-receiving area of the tire carcass 60. FIG. 4B is a front cross-sectional view of the tire-membrane assembly shown in FIG. 4A after the detachable connectors 20 have been removed from each of the voids 28 after a curing process, in accordance with a particular embodiment of the invention. In this embodiment, a U-shaped impression is formed.

With further regard to shaping the bonding layer with the detachable connector, it has been discussed that in certain embodiments, the bottom side of the detachable connector contains a molding cavity configured for forming a molded feature in the bonding layer such that upon forcefully engaging the bonding layer the molding cavity forms a molded feature extending outwardly from the bonding layer and into the void. With reference to the embodiment of FIGS. 5A-5B, a molding cavity 26 is shown arranged along a bottom side of the detachable connector 20. The molding cavity 26 has a depth extending into a thickness of the detachable connector 20. The molding cavity 26 can form any volumetric shape configured to form any desired molded feature in the bonding layer 70. For example, the molding cavity 26 may be shaped to form a wear indicator or a stone ejector. With reference to an exemplary embodiment in FIG. 5D, a corresponding molded feature $29_F$ is shown formed along the bottom end 29 of the through-void 28 within the bonding layer 70. It is contemplated that the bonding layer 70, at least in the location arranged at the bottom of a through-void of the tread, may be thickened to provide a sufficient excess of bonding material to form the molded feature.

It has been noted that the detachable connector may form any shape. With reference to an exemplary embodiment in FIGS. 5A-5C, a detachable connector 20 is shown having a non-linear top side $25_T$ arranged opposite a bottom side $25_B$ relative a thickness of the detachable connector. This is done so to reduce the amount of material discarded after the detachable connector has been separated and removed from the tread. The bottom side $25_B$ comprises an impression surface configured to form a U-shaped impression in the bonding layer. The bottom side $25_B$ also includes an impression surface comprising a molding cavity 26 configured to form a molded feature in the bonding layer (discussed further herein). The non-linear top side $25_T$ in cooperation with a non-linear bottom side $25_B$ defines a thickness that is variable in a lengthwise direction of the connector and a lateral or widthwise direction of the connector 20. The non-linear top side $25_T$ and bottom side $25_B$ may each extend along any desired non-linear path, such as a waveform or a stepped function. It is also noted that each of the top and bottom sides $25_T$, $25_B$ may extend linearly in any lateral or lengthwise direction of the connector 20, while having either a constant of variable thickness. It is also appreciated that the connector thickness may be constant even when both the top and bottom sides $25_T$, $25_B$ are non-linear.

It has been discussed herein that the detachable connector may be separated from the tread when the flexible bonding layer forcibly engages the detachable connector, such as discussed in association with FIG. 3C, by example. It has also been discussed that discontinuities may be formed into the detachable connector to assist in this separation, where such discontinuities may form any shaped discontinuity and may be formed by any desired operation. For example, with reference to the embodiment of FIG. 5C, discontinuities $24_X$ are molded into the detachable connector 20, and more specifically, along the length of each of the pair of connecting portions 24. Accordingly, it can be said that each connecting portion 24 comprises a plurality of segments $24_S$ spaced apart in a lengthwise direction of the connector. The plurality of segments $24_S$ may be spaced apart to form a variably spaced arrangement of segments, or may be spaced apart to form a constantly spaced arrangement of segments or a spaced pattern of segments to form an array of segments. It is also noted that the discontinuities $24_X$ in FIG. 5C extend across the full width of each connecting portion 24, although in other embodiments, a discontinuity may extend less than the full width of the connecting portion. Other means for forming discontinuities are contemplated, and have been discussed previously.

It has been discussed using guide members arranged along the bonding layer to better arrange and align the tread along the bonding layer and the tire carcass. With reference to an exemplary embodiment in FIG. 6, a tire tread 10 is shown aligned along the bonding layer 70 and the tire carcass 60 by use of a plurality of guide members 84. In the embodiment shown, the guide members 84 are elongate members having a length extending in a circumferential direction of the tire carcass. To achieve the purpose of aligning the tread 10 relative the bonding layer 70 and/or tire carcass 60, the guide members 84 are arranged within each of the through-voids 28, and in particular, within a bottom void portion 28B of the through-void.

FIG. 7 is a front cross-sectional view of a tire tread 10 having a detachable connector 20 arranged within each of a plurality of through-voids 28, showing the bottom side 14 of the tread being buffed prior to arranging the tire tread upon the tire carcass, the buffing operation being performed by a buffing member 90 having an insertion member 96 arranged within a bottom of each void, where the insertion member protects one of the detachable connectors 20 from the buffing member, in accordance with a particular embodiment of the invention. The buffing member 90 includes a plurality of buffing sections 92 each comprising strands of material, the buffing sections rotating about a central rotational axis 94. In the exemplary embodiment shown, the insertion member 96 comprises a rotatable disk having a shaped outer circumference 98 comprising a V-shaped profile—although it is contemplated that any desired profile may be employed as desired to achieve the purpose of protecting and/or deflecting the connector inward. As discussed above, other buffing members and insertion members are contemplated, including buffing members that buff a portion of the bottom side width or substantially the entire width of the bottom side as generally shown in FIG. 7.

FIG. 8 is a front cross-sectional view of a tire carcass 60 with a bonding layer 70 arranged along the annular tread-receiving area of the tire carcass, and overtop a plurality of open voids 62 arranged along the annular tread-receiving area, where an impression member 100 is being used to form impressions 72 in the bonding layer, and in particular, overtop each of the open voids, in accordance with a particular embodiment of the invention. These impressions 72 are formed prior to application of the tread, such that the connecting members may further deform the bonding layer, thereby altering the shape and/or depth of the pre-formed impression 72 to achieve a desired final impression. The impression member includes a rotatable disk 102 (rotating about rotational axis 106) including an outer circumference having a profile 104 shaped as desired to form a relief of such shaped profile within the bonding layer comprising impression 72. As discussed above, other buffing members and insertion members are contemplated, including buffing members that buff a portion of the bottom side width or substantially the entire width of the bottom side as generally shown in FIG. 7. As discussed above, other impression members are contemplated and may be employed in such methods to achieve any desired impression 72.

The present invention may be utilized in association with retreaded tires, and in particular for heavy duty trucks and trailers. Heavy duty truck tires include steer and drive tires and trailer tires. Nevertheless, the present invention may be utilized in association with any type of tire to form new or retreaded tire and as such, any type of tire may provide an embodiment of the present invention. Exemplary tire types for use with the subject invention further include light truck tires, off the road tires, bus tires, aircraft tires, bicycle tires, motorcycle tires, and passenger vehicle tires.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A method of forming a retreaded tire comprising the steps of:
   providing a tire carcass configured to receive a tire tread along an annular tread-receiving area, the annular tread-receiving area arranged along a radially outer side of the tire carcass and having a width extending laterally across a width of the tire carcass and a length extending annularly around the tire carcass;
   providing a pre-cured tire tread comprising:
      a tread body having a length, a width, and a thickness, the thickness being bounded by a top side and a bottom side of the tread; and,
      a detachable connector arranged within a void within the thickness of the tread between a top void portion and a bottom void portion, the top void portion extending into the tread thickness from the top side of the tread and the bottom void portion extending into the tread thickness from the bottom side of the tread, the detachable connector extending across a width of the top void portion and a width of the bottom void portion such that the detachable connector is attached to each of a pair of opposing sides of each top and bottom void portion, the detachable connector configured to separate from the tread upon application of a separation force;
   assembling a retreaded tire by arranging the tire tread atop a bonding layer in an installed configuration, the bonding layer arranged between the tire tread and the tire carcass;

bonding the tire tread to the tire carcass, where a flexible curing membrane is arranged along the top side of the tire tread such that during the step of bonding, the flexible membrane extends into the top void portion from the top side to forcefully engage and displace the detachable connector downward into the void in a direction toward the bottom side and toward the bottom void portion such that the flexible membrane at least partially separates the detachable connector from at least one side of the pair of opposing sides of the void; and, removing the detachable connector from the top void portion after the step of bonding.

2. The method of claim 1, where, in forcefully engaging and displacing the detachable connector downward into the void in a direction toward the bottom void portion during the step of bonding, the flexible membrane at least partially separates the detachable connector from each of the pair of opposing sides of the void.

3. The method of claim 2, where, in forcefully engaging and displacing the detachable connector downward into the void in a direction toward the bottom void portion during the step of bonding, the flexible membrane substantially separates the detachable connector from each of the pair of opposing sides of the void.

4. The method of claim 1, where, in forcefully engaging and displacing the detachable connector downward into the void in a direction toward the bottom void portion during the step of bonding, a bottom side of the detachable connector forcefully engages the bonding layer at a bottom of the void along the bottom side of the tread body.

5. The method of claim 4, where the bottom side of the detachable connector includes an impression surface configured for forming an impression within the bonding layer, such that in forcefully engaging the bonding layer the bottom side of the detachable connector imprints a relief of the impression surface into the bonding layer.

6. The method of claim 4, where in forcefully engaging and displacing the detachable connector downward into the void in a direction toward the bottom void portion during the step of bonding, the detachable connector is positioned within an open void arranged along the annular tread-receiving area below the bonding layer.

7. The method of claim 1, where the detachable connector is molded with the tire tread.

8. The method of claim 1, where the detachable connector comprises a central portion arranged between a pair of connecting portions, each of the pair of connecting portions extending between the central portion and one of the pair of opposing sides of the void.

9. The method of claim 1, where the void is a longitudinal groove.

10. The method of claim 1, where a release agent is arranged along a bottom side of the detachable connector, where the release agent is configured to prevent a substantial bonding between the detachable connector and the bonding layer should the detachable connector and the bonding layer come into contact during the curing process.

11. The method of claim 10, where the release agent is a strip of material or a fluid composition.

12. The method of claim 1, where the curing membrane has a thickened portion arranged along an interior side of the membrane, the thickened portion being configured to extend into the void from the top side of the tread to engage the detachable connector.

13. The method of claim 1, where prior to application to the tire carcass, the bottom side of the tread is buffed using a wheel extending into the bottom of the void to engage the detachable connector, which deflects the detachable connector away from the bottom side while the bottom side is being buffed.

14. The method of claim 1, where the step of assembling includes pre-forming an impression along the bonding layer at a location where the void in the tread will be arranged overtop prior to arranging the tread atop the bonding layer.

15. The method of claim 1, where the step of assembling includes arranging a guide member along the tire carcass atop the bonding layer and subsequently arranging the tread atop the bonding layer and the guide member.

16. A method of forming a retreaded tire comprising the steps of:
providing a tire carcass configured to receive a tire tread along an annular tread-receiving area, the annular tread-receiving area arranged along a radially outer side of the tire carcass and having a width extending laterally across a width of the tire carcass and a length extending annularly around the tire carcass;
providing a pre-cured tire tread comprising:
a tread body having a length, a width, and a thickness, the thickness being bounded by a top side and a bottom side of the tread; and,
a detachable connector arranged within a void within the thickness of the tread between a top void portion and a bottom void portion, the top void portion extending into the tread thickness from the top side of the tread and the bottom void portion extending into the tread thickness from the bottom side of the tread, the detachable connector extending across a width of the top void portion and a width of the bottom void portion such that the detachable connector is attached to each of a pair of opposing sides of each top and bottom void portion, the detachable connector configured to separate from the tread upon application of a separation force;
assembling a retreaded tire by arranging the tire tread atop a bonding layer in an installed configuration, the bonding layer arranged between the tire tread and the tire carcass;
bonding the tire tread to the tire carcass, where a flexible curing membrane is arranged along the top side of the tire tread such that during the step of bonding, the flexible membrane extends into the top void portion from the top side to forcefully engage and displace the detachable connector downward into the void in a direction toward the bottom side; and,
removing the detachable connector from the top void portion after the step of bonding,
where, in forcefully engaging and displacing the detachable connector downward into the void in a direction toward the bottom void portion during the step of bonding, a bottom side of the detachable connector forcefully engages the bonding layer at a bottom of the void along the bottom side of the tread body, the bottom side of the detachable connector including an impression surface configured for forming an impression within the bonding layer, such that in forcefully engaging the bonding layer the bottom side of the detachable connector imprints a relief of the impression surface into the bonding layer, where the bottom side of the detachable connector contains a molding cavity configured for forming a molded feature in the bonding layer such that upon forcefully engaging the bonding layer the molding cavity forms a molded feature extending outwardly from the bonding layer and into the void.

17. The method of claim 16, where the molded feature is a wear indicator or a stone ejector.

18. A method of forming a retreaded tire comprising the steps of:
provingd a tire carcass configured to receive a tire tread along an annular tread-receiving area, the annular tread-receiving area arranged along a radially outer side of the tire carcass and having a width extending laterally across a width of the tire carcass and a length extending annularly around the tire carcass;
providing a pre-cured tire tread comprising:
a tread body having a length, a width, and a thickness, the thickness being bounded by a top side and a bottom side of the tread; and,
a detachable connector arranged within a void within the thickness of the tread between a top void portion and a bottom void portion, the top void portion extending into the tread thickness from the top side of the tread and the bottom void portion extending into the tread thickness from the bottom side of the tread, the detachable connector extending across a width of the top void portion and a width of the bottom void portion such that the detachable connector is attached to each of a pair of opposing sides of each top and bottom void portion, the detachable connector configured to separate from the tread upon application of a separation force;
assembling a retreaded tire by arranging the tire tread atop a bonding layer in an installed configuration, the bonding layer arranged between the tire tread and the tire carcass;
bonding the tire tread to the tire carcass, where a flexible curing membrane is arranged along the top side of the tire tread such that during the step of bonding, the flexible membrane extends into the top void portion from the top side to forcefully engage and displace the detachable connector downward into the void in a direction toward the bottom side; and,
removing the detachable connector from the top void portion after the step of bonding,
where the detachable connector comprises a central portion arranged between a pair of connecting portions, each of the pair of connecting portions extending between the central portion and one of the pair of opposing sides of the void, and where one or more discontinuities are arranged along a length of at least one of the pair of connecting portions.

19. The method of claim 18, where the one or more discontinuities form a plurality of segments spaced apart along the length of the pair of connecting portions.

20. The method of claim 18, where each of the one or more discontinuities are formed by perforating the at least one of the pair of connecting portions.

* * * * *